United States Patent [19]
Turner et al.

[11] 3,913,744

[45] Oct. 21, 1975

[54] LUMBER SORTER APPARATUS

[76] Inventors: Donald B. Turner; Gary F. Thomas, both of 9250 N. Decatur St., Portland, Oreg. 97203

[22] Filed: Aug. 12, 1974

[21] Appl. No.: 496,545

Related U.S. Application Data

[63] Continuation of Ser. No. 363,430, May 24, 1973, abandoned.

[52] U.S. Cl............. 209/74 R; 214/6 H; 214/16 B
[51] Int. Cl.[2].................... B07C 9/00; B61D 45/00
[58] Field of Search.....209/74 R, 125, 90; 214/6 H, 214/6 B

[56] References Cited
UNITED STATES PATENTS

| | | | |
|---|---|---|---|
| 3,155,245 | 11/1964 | Brandon | 214/16 |
| 3,606,011 | 9/1971 | Jeddeloh | 209/74 X |
| 3,653,506 | 4/1972 | Turner et al. | 209/74 R |
| 3,700,120 | 10/1972 | Romick | 209/74 R |

Primary Examiner—M. Henson Wood, Jr.
Assistant Examiner—Gene A. Church
Attorney, Agent, or Firm—Kolisch, Hartwell, Dickinson & Stuart

[57] ABSTRACT

A lumber sorter including a plurality of lumber-receiving bins, a lumber-carrying conveyor traveling over the bins, and an ejector for ejecting and dropping selected pieces of lumber from the conveyor into selected ones of the bins. A bin includes a pair of spaced-apart, facing walls, both of which are inclined in the same direction from the vertical, and a substantially horizontal, vertically shiftable bin floor extending between the walls. The bin floor is shiftable in increments between a raised position adjacent the top of the bin for receiving lumber when the bin is empty and a lowered position adjacent the bottom of the walls when the bin is full. The bin floor can be lowered to a position below the level of an unloading conveyor underlying the bin to deposit a load of lumber gently onto the unloading conveyor.

12 Claims, 6 Drawing Figures

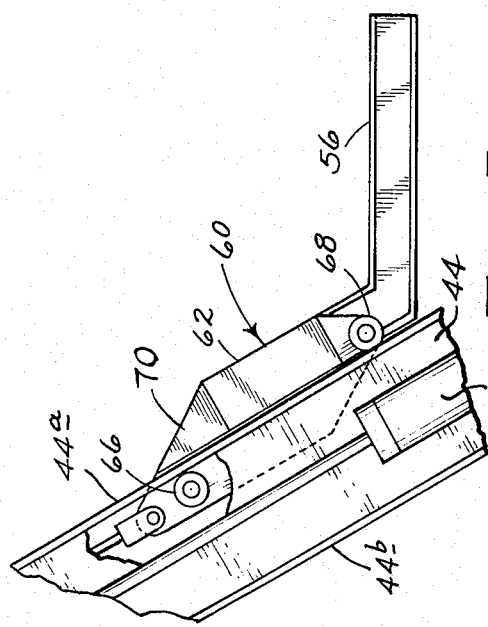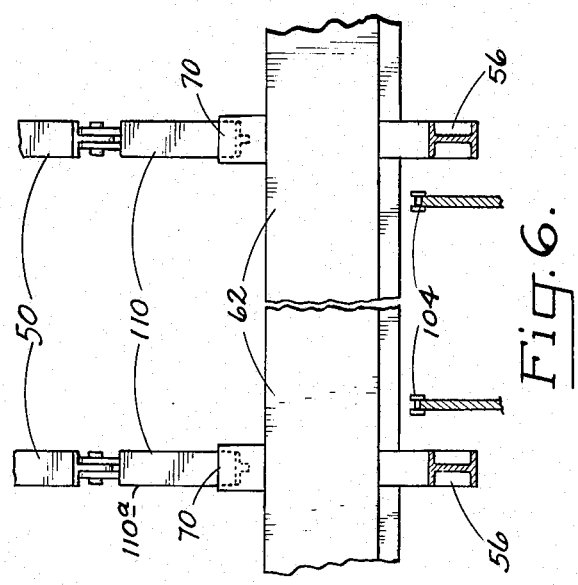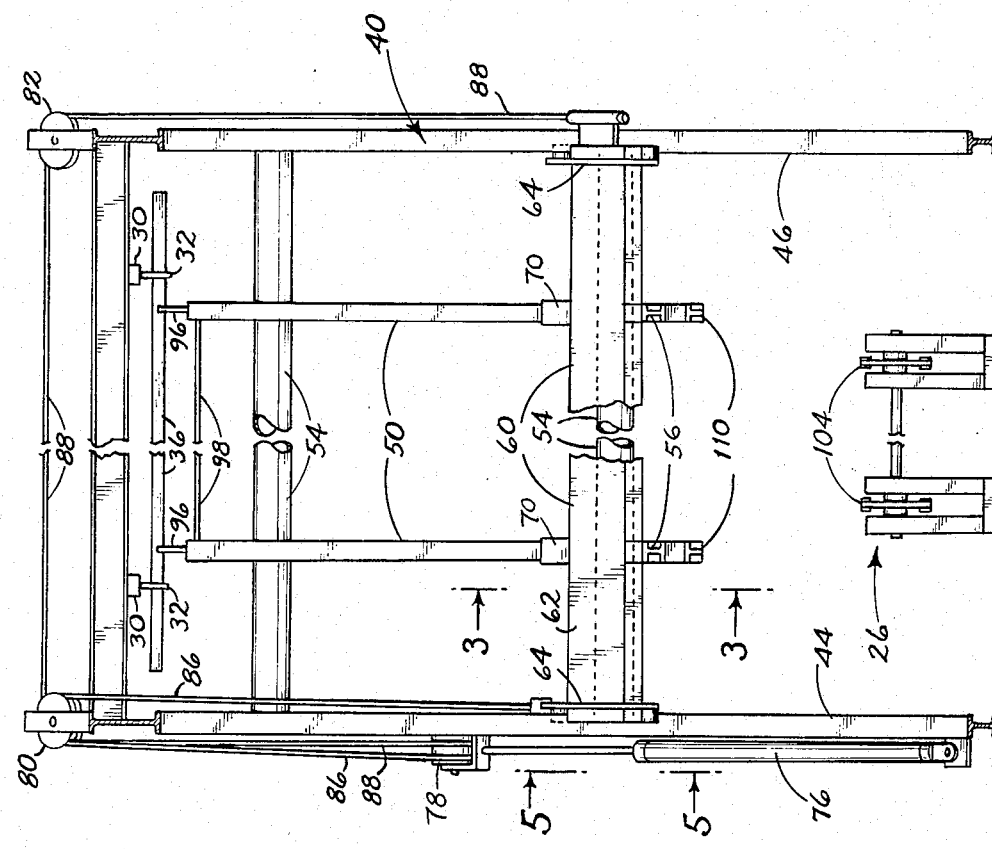

LUMBER SORTER APPARATUS

REFERENCE TO RELATED APPLICATION

This is a continuation of application Ser. No. 363,430, filed May 24, 1973 now abandoned.

SUMMARY AND BACKGROUND OF THE INVENTION

This invention relates to apparatus for sorting lumber wherein pieces of lumber having similar characteristics are dropped into a selected one of a plurality of bins. More specifically, it relates to sorting apparatus in which a bin has inclined walls and a bin floor which is shiftable in increments between a raised position when the bin is empty and a lowered position when the bin is full.

In lumber mill operations boards generally are produced in random sizes and grades and then are classified and separated into specific groups, or stacks, by the use of a multiple bin sorter. Such sorters generally include a plurality of bins over which a lumber-carrying conveyor travels, with the conveyor being operable to drop boards having selected characteristics, (i.e., of specific size, length, width, thickness, grade, etc.) into selected ones of the bins. Prior sorters generally have had bins with vertical sides and fixed floors therein onto which the lumber is dropped. Since the fixed-height floor of the bin must be at a sufficient distance below the conveyor to allow a considerable stack of lumber to be deposited in the bin, the initial boards dropped into the bin fall a substantial distance. Considerable damage may occur to the boards when dropped through such distance onto the bin floor, or onto previously deposited boards.

Recently bins having vertically shiftable floors have been designed to alleviate this problem somewhat. Such newly designed bins, however, are designed with vertical walls. This generally requires that the apparatus provide means for dropping alternate boards into a bin first adjacent its upstream wall and then adjacent its downstream wall to attain any semblance of a uniform accumulation of lumber in the bin. Such previous bins with vertically shiftable floors also generally have discharged an accumulated stack of lumber from the bin merely by opening the bottom of the bin and dropping the stack through some distance onto an underlying conveyor or truck. With such discharge, since the boards once again are dropped, damage may occur to the boards. The vertical walls of such bins further provide no underlying support for a stack of lumber in a bin, and thus all the weight of the accumulated lumber in a bin must be borne by the mechanism supporting the shiftable floor. This produces high stress concentrations in such mechanism and results in maintenance problems.

A general object of the present invention is to provide novel lumber sorting apparatus which is operable to take care of the above-outlined problems of previously designed apparatus in an economical and satisfactory manner.

More specifically, an object is to provide novel sorting apparatus which includes a bin into which lumber may be dropped, the bin having facing, opposed, walls inclined from the vertical in a common direction, and a shiftable floor extending therebetween for supporting lumber dropped into the bin. Such construction permits the upwardly facing surface of an inclined bin wall to provide at least a portion of the underlying support for a stack of lumber dropped into the bin. This reduces the load on the bin floor and the means mounting the bin floor for shifting, thus reducing maintenance and wear.

Another object is to provide such novel apparatus which is so constructed that boards may be dropped from a single point above the bin and will still accumulate in a relatively uniform manner in the bin.

A still further object is to provide novel sorting apparatus which has an unloading conveyor beneath a sorting bin, and the vertically shiftable bin floor is lowerable to a position below the level of the unloading conveyor, so that it may set lumber gently on the unloading conveyor. This feature eliminates a large portion of board damage which may occur in the dropping of lumber on unloading which has occurred in previous designs.

Yet another object is to provide novel sorting apparatus which includes bins having vertically shiftable floors, an unloading conveyor spaced a distance below the bottom ends of the bin walls, and means mounting the bin floors whereby they may be lowered individually to positions below the conveyor so that they may gently deposit lumber on the conveyor. Also included is extension means which is operable to close off the space between the bottom of a supportive bin wall and the conveyor when the bin floor is lowered to deposit lumber on the conveyor, and which is shiftable out of the path of lumber carried on the conveyor when the bin floor is raised.

DRAWINGS

These and other objects and advantages will become more fully apparent as the following description is read in conjunction with the drawings, wherein:

FIG. 2 is an elevation view taken generally along the line 2—2 in FIG. 1, with an accumulation of lumber removed;

FIG. 5 is an enlarged cross-sectional view taken generally along the line 5—5 in FIG. 2; and FIG. 6 is a view taken generally along the line 6—6 in

DETAILED DESCRIPTION OF AN EMBODIMENT OF THE INVENTION

Figure 1:
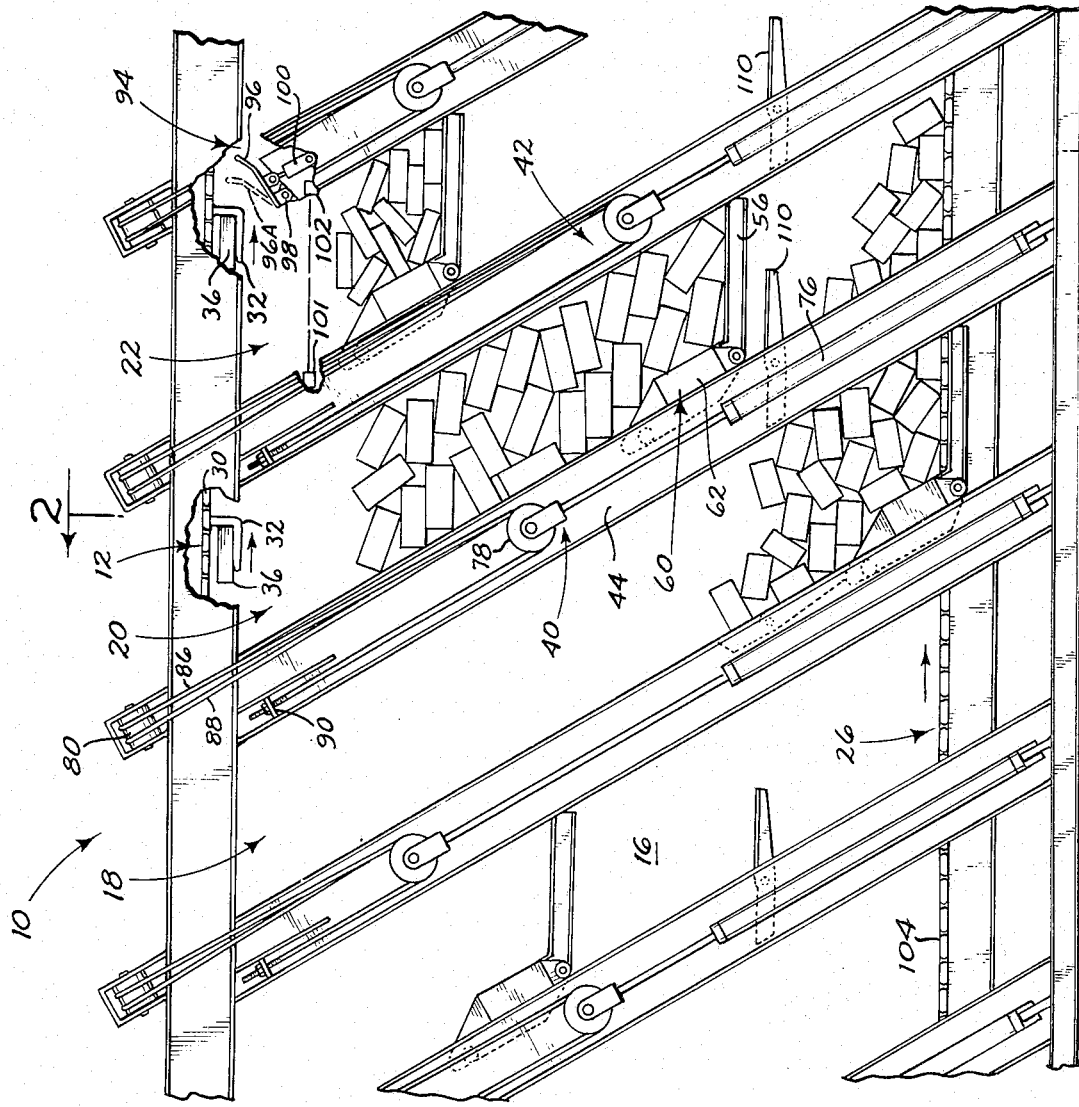
FIG. 1 is a side elevation view of a portion of sorting apparatus constructed according to an embodiment of the invention.

Referring to the drawings, and first more specifically to FIG. 1, at 10 is indicated generally apparatus constructed according to an embodiment of the invention. In broad terms, the apparatus includes a lumber-carrying conveyor 12 for moving individual boards in succession along a substantially horizontal path over a plurality of bins, such as those indicated generally at 16, 18, 20, 22 and an unloading conveyor 26 beneath the bins onto which lumber may be deposited from the bins. In the drawings only four bins are illustrated, but it should be understood that any number of bins may be employed; the number of bins used being dependent upon the number of groups into which it is desired to sort the lumber.

Referring to FIGS. 1 and 2, conveyor 12 includes at least a pair of laterally spaced, substantially parallel, endless chains 30 having lower reaches which are driven under power in a substantially horizontal path, to the right in FIG. 1, over the tops of the bins. Secured to each of chains 30, at intervals spaced therealong, are L-shaped lumber-carrying members 32. Members 32 are aligned laterally of the conveyor path with corresponding members on the other chains and are operable to carry individual boards as illustrated at 36, with the boards extending laterally of the conveyor path. The upstream ends of the members are open, as seen in FIG. 1, so that a board may be ejected from the carrying members 32, as will be described in greater detail below.

A bin, and referring specifically to bin 20, includes a pair of opposed, spaced-apart, inclined bin walls 40, 42. Wall 40 is referred to herein as the rear wall of bin 20 and wall 42 is referred to as the front wall. The walls throughout the series of bins are all similar, and thus only that indicated generally at 40 will be described in detail.

Referring to FIGS. 1 and 2, wall 40 includes a pair of parallel, laterally spaced, elongated support columns 44, 46. Each of columns 44, 46 is an H-beam which is disposed on an incline with (as is seen in FIG. 5) one of its flanges 44a facing upwardly and its other flange 44b facing downwardly.

Referring again to FIG. 2, a plurality of elongated, laterally spaced, substantially parallel I-beam wall members 50 are disposed intermediate and parallel to support columns 44, 46. Support columns 44, 46 and wall members 50, are secured to each other through elongated, horizontal, tubular supports 54 which extend therebetween and are secured thereto, as by welding. The upper ends of wall members 50 are spaced a distance below the path of members 32 on conveyor 12 and their lower ends are spaced a distance above unloading conveyor 26. It has been found that the optimum position for a bin wall is inclined in the range of 25° – 40° from the vertical.

A floor for the bin is formed by a plurality of elongated, laterally spaced, parallel, horizontal H-beam floor members 56 which extend between walls 40, 42, as seen in FIGS. 1 and 2. Floor members 56 are mounted on a carriage 60 for raising and lowering in the bin along a path paralleling the incline of the bin walls. Carriage 60 includes an elongated box beam 62 which, as is seen in FIGS. 2, extends transversely of the apparatus between support columns 44, 46. Members 56 are secured, as by welding, to the underside of beam 62 (see FIGS. 3–6).

Support plates, such as that illustrated at 64 in FIGS. 2 and 5, are secured to opposite ends of beam 62. Plates 64 have a pair of rollers 66, 68 journaled thereon in such positions as to engage and roll on the underside, and top side, respectively, of upper flange 44a on column 44 and the corresponding upper flange on column 46.

Floor members are spaced apart on beam 62 in such positions that they ride on wall members 50 (see FIG. 2). Triangular transition members 70 secured to the top of beam 62 above each of the floor members also are positioned to ride on wall members 50. Each of members 70 forms a ramp surface between the upper surfaces of the wall members and the upper surface of box beam 62 to permit boards dropped into the bin to move over beam 62 and onto the floor members.

An elongated, fluid-operated, ram 76 is operatively connected to carriage 60 for raising and lowering the same and the floor members 56 secured thereto. As is best seen in FIGS. 1 and 2, ram 76 is secured at its cylinder end to the lower end of support column 44 and has a double-sheave pulley block 78 secured to its rod end. A pair of sheaves 80 are journaled for rotation on an inclined axis above the upper end of column 44, and a single sheave 82 is journaled for rotation about an inclined axis above the upper end of column 46.

A pair of cables 86, 88 are secured at one set of their ends to a securing lug 90 secured adjacent the top of column 44, are trained in reverse bends about the sheaves of pulley block 78, and extend upwardly over sheaves 80. Cable 86 is trained in a reverse bend around one of sheaves 80 and is secured at its other end to support plate 64 supported on column 44. Cable 88 extends in a reach over the top of the apparatus, is trained over sheave 82, and is secured at its other end to support plate 64 on support column 46. Such cable interconnection between ram 76 and carriage 60 produces vertical shifting of carriage 60 and its associated bin floor members 56 on contraction or extension of ram 76. Explaining further, contraction of ram 76 raises the carriage and floor members to a raised position adjacent the top of the bin, as illustrated for bin 22, and extension of the ram lowers the carriage and floor members in the bin.

Positioned atop each of the bin walls is ejector mechanism, such as that indicated generally at 94, associated with bin 22. The ejector mechanism includes at least a pair of elongated arms 96 pivotally mounted atop a pair of laterally spaced wall members 50 and connected to a common shaft 98 extending therebetween. At least one of arms 96 has a fluid-operated ram 100 connected thereto for rotating shaft 98 and arms 96 between an inoperative position, as shown for an arm in solid outline in FIG. 1, spaced below the path of travel for a board carried on the conveyor 12 and an operating position, as shown in dot-dashed outline for an arm at 96A, extending upwardly and into the path of a board. With the arms swung to their operating positions, they are operable to wipe, or eject, a board from its associated members 32 on conveyor 12 and drop it into a selected bin.

Each ejector mechanism may be operated at the proper time to eject boards into preselected bins either by an operator who visually judges the characteristics of each board or by automatic sensing means which is known in the art.

Referring again to FIG. 1, where portions of the top of the front and rear walls of bin 22 have been broken away, at 101, 102 are illustrated a light source and photocell, respectively, secured to the walls on opposite sides of the bin. A board falling from conveyor 32 and boards stacked in the bin to a level higher than the light source 101 and photocell 102 will break the light beam extending therebetween to produce a signal. Appropriate electrical circuitry (not shown) interconnects the photocell and means for supplying pressure fluid to a ram 76 associated with the bin. Such circuitry is operable to disregard the brief interruption of the light beam produced by a board falling therethrough, but is operable to control operation of ram 76 associated with the bin to lower the bin floor a preselected incremental distance when an accumulation of boards in the bin interrupts the beam for a predetermined time interval. The bin floor thus may index downwardly in increments, as a stack of lumber builds up in the bin, with the top of the stack remaining a short distance below conveyor 32 to minimize the distance, and thus the damage to boards dropped into the bin.

Referring now to FIGS. 1, 2 and 6, unloading conveyor 26 includes a plurality of elongated, endless, conveyor chains 104 which have substantially horizontal upper reaches powered for movement in a downstream direction, to the right in FIG. 1 under the bin walls. As has been mentioned previously, conveyor 26 is spaced a distance below the bottom ends of wall members 50, thus leaving a path along which boards deposited on the upper reaches of chains 104 may be conveyed under the wall members of the bins.

Figure 4:
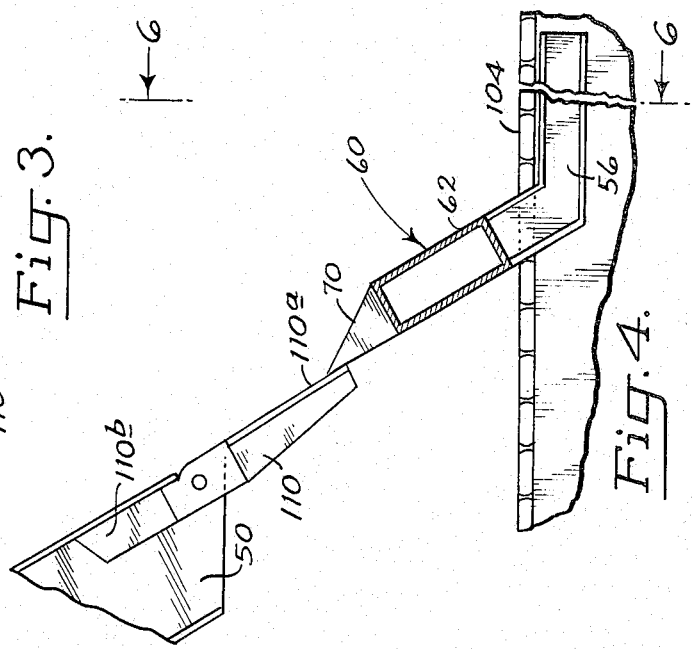
FIG. 4 is a view somewhat similar to FIG. 3, however, in FIG. 4 the bin floor is lowered to a position wherein it may deposit lumber onto an unloading conveyor.

Carriage 60 and its associated floor member 56 are lowerable, on extension of ram 76, to a position as shown in FIGS. 4 and 6, wherein floor members 56 are below, and spaced laterally of the upper reaches of chains 104, which are also referred to herein as conveyor elements. This unloading position also is illustrated by the floor of bin 18 in FIG. 1.

Figure 3:
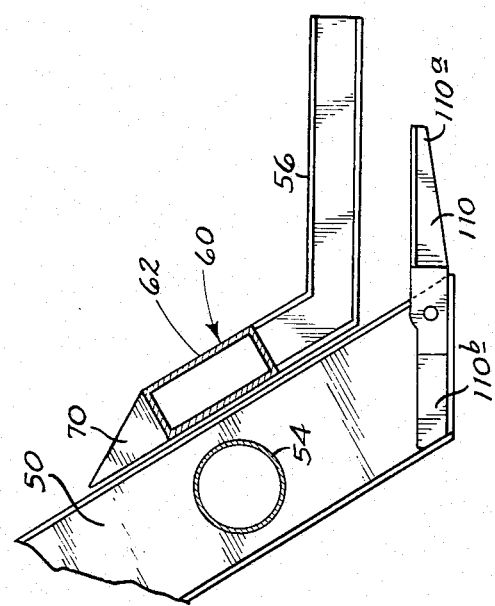
FIG. 3 is an enlarged cross-sectional view taken generally along the line 3—3 in FIG. 2 with a bin floor in a position it may occupy when the bin is filled.

Elongated extension members 110 are pivotally connected intermediate their ends to the lower ends of wall members 50. Each of the extension members has an end portion 110a which extends outwardly from one side of the pivot connection, beneath a floor member 56, and a couterbalancing weighted portion 110b projecting in the opposite direction from the pivot connection. The extension member normally is biased, by portion 110b, into an inoperative position as shown in FIG. 3 with portion 110a extending substantially horizontally under a floor member 56. Lowering of the carriage and floor members toward the unloading position shown in FIG. 4 causes the floor members to engage members 110 and swing them to their operative positions, as shown in FIG. 4, with portions 110a of members 110 extending across the path for material conveyed along conveyor 26 and closing off the space between the lower ends of wall members 50 and the floor members.

Explaining briefly the operation of the apparatus, boards are carried by members 32 on conveyors 30 to the right in FIG. 1 over the tops of the bins. At such time as a board is moved by the conveyor into a position over the bin into which it should be deposited, the ejector mechanism on the bin wall on the downstream side of that bin is operated, whereby arms 96 of such ejector mechanism are raised into the path of the board. This causes the board to be wiped from members 32 and dropped into the bin. When the bin is empty, the ram associated therewith is contracted and the associated carriage and floor members are raised to a position, as illustrated for the floor in bin 22, adjacent the top of the bin. With the bin floor thus positioned, boards dropped into the bin have a minimum distance to fall.

The light source 101 and photocell 102 at the top of the bin are operable to detect, or sense, the height of an accumulation of lumber in the bin. The photocell, being connected to ram 76 through appropriate control circuitry, is operable to produce incremental extension of the ram associated with the bin. This lowers the bin floor in increments as the same is loaded, to maintain the top of an accumulation of lumber therein at approximately a predetermined elevation. As the bin is filled, it is lowered toward the position for a full bin as illustrated by the position of the floor in bin 20.

When the bin has been filled with a predetermined amount of lumber, as determined either by the height of the accumulation as sensed by photocell 102, or by a counter, the same may be emptied by lowering the bin floor below the top reaches of the chains 104 of unloading conveyor 26 through further extension of the ram, as illustrated for bin 18. As the bin floor lowers, extension members 110 are swung downwardly to the position shown in FIG. 4 to close off the space between the lower ends of bin wall members 50 and the arms, whereby lumber in the bin is supported in its downward travel toward the conveyor chains. The lumber in the bin is deposited relatively gently on the conveyor chains by such lowering of the bin floor and is conveyed away therefrom, as is illustrated for the lumber being emptied from bin 18. Once the bin is emptied, the ram associated with that bin is retracted to move the bin floor once again to its raised position, as illustrated for the floor of bin 22. This also permits members 110 to swing back to their inoperative positions.

Apparatus having such construction provides an indexable bin floor which is shiftable between a raised position for catching the lumber dropped from the lumber-carrying conveyor when the bin is empty, to a lowered position when the bin is filled, and further is lowerable to an unloading position whereby it may set lumber from the bin gently on an unloading conveyor. Further, with the bin walls being inclined, at least a part of the stack of lumber received in a bin receives underlying support from the bin wall itself. This reduces the stress on the mechanism mounting the bin floor and reduces wear and maintenance on such parts.

Another advantage of such construction is that only one ejector mechanism need be provided for each bin. The slope of the bin walls permits lumber dropped therein to accumulate in a relatively uniform manner in the bin.

While a preferred embodiment of the invention has been described herein, it should be apparent to those skilled in the art that variations and modifications are possible without departing from the spirit of the invention.

It is claimed and desired to secure by letters patent:

1. A lumber sorter comprising
   a lumber-carrying conveyor operable to carry lumber along a path adjacent a plurality of sorting stations,
   means for ejecting lumber from said conveyor at selected sorting stations, and
   lumber-receiving bins underlying said conveyor at said stations into which lumber may fall when ejected from the conveyor, a bin including a pair of spaced-apart, facing, inclined bin walls inclined in the same direction from the vertical, and a substantially horizontal bin floor extending between said bin walls,
   an unloading conveyor underlying a bin having an upper surface adapted to receive and carry lumber away from the bin, and
   means mounting said bin floor for movement between a raised position adjacent the upper ends of the bin walls for receiving lumber when the bin is empty and a lowered position below the level of said surface of the unloading conveyor, with the bin floor maintained substantially horizontal throughout lowering, whereby lumber supported on the bin floor may be deposited on the unloading conveyor.

2. The sorter of claim 1, wherein said means mounting said bin floor comprises a carriage mounted for movement on, and in a line paralleling a bin wall.

3. The sorter of claim 1, wherein a bin wall is inclined at such an angle from the vertical that the same presents an upwardly facing surface upon which an accumulation of lumber dropped into the bin may rest and be at least partially supported thereby.

4. The sorter of claim 1, wherein said unloading conveyor comprises a conveyor element extending under said walls and having an upper surface adapted to receive and carry lumber away from the bin, said bin floor comprises at least a pair of elongated floor members having upper surfaces occupying a common substantially horizontal plane, and said means mounting the bin floor accommodates lowering of said floor members to positions spaced laterally of said conveyor element and with their upper surfaces below the upper surface of the conveyor element.

5. The sorter of claim 1, wherein a bin wall is inclined at such an angle from the vertical that the same presents an upwardly facing surface upon which an accumulation of lumber dropped into the bin may rest and be at least partially supported thereby and said unloading conveyor includes an elongated conveyor element having an upper support surface spaced a distance below and extending under a plurality of adjacent bin walls in the sorter adapted to receive lumber from a bin and transport the same away from said bin along a path under others of said bin walls, and which further comprises extension means associated with a bin wall shiftable between a first position out of the path of lumber carried by said conveyor element and a second position in which it defines an extension of its associated wall extending between the lower end of said wall and the bin floor when the bin floor is lowered to a position below the level of the unloading conveyor.

6. The sorter of claim 5, which further comprises means for shifting said extension means from its first to its second position as the bin floor is moved to a position below the level of the unloading conveyor and means for returning said member to its first position when the bin floor is raised.

7. The sorter of claim 6, wherein said extension means comprises an elongated arm pivotally connected intermediate its ends to said bin wall with an end portion of the arm, when in its first position, projecting substantially horizontally outwardly beneath the bin floor, and said means for returning the member from its second to its first position comprises yieldable biasing means urging said members to said first position.

8. In lumber handling apparatus, a bin in which boards may be deposited and accumulated comprising a pair of spaced-apart, facing, inclined bin walls inclined in the same direction from the vertical, a substantially horizontal bin floor extending between said bin walls, an unloading conveyor underlying the bin operable to receive and carry lumber away from the bin, and means mounting said bin floor for vertical movement between a raised position adjacent the tops of said walls when the bin is empty and a lowered position below the level of said unloading conveyor with the bin floor maintained substantially horizontal throughout lowering, whereby lumber on the bin floor may be deposited on the unloading conveyor.

9. The apparatus of claim 8, wherein said unloading conveyor comprises an elongated conveyor element extending under said bin walls, said bin floor comprises at least a pair of elongated floor members having upper surfaces occupying a common substantially horizontal plane, and said means mounting the bin floor accommodates lowering of said floor members to positions spaced laterally of said conveyor element and with their upper surfaces below the upper surface of the conveyor element.

10. The apparatus of claim 8, wherein a bin wall is inclined at such an angle from the vertical that the same presents an upwardly facing surface upon which an accumulation of lumber deposited in the bin may rest and be at least partially supported thereby and said unloading conveyor is spaced a distance below the lower end of said one wall operable to receive lumber from the bin and carry it away therefrom, and which further comprises extension means mounted adjacent the lower end of said bin wall shiftable between a first position removed from the space between the lower end of said bin wall and the unloading conveyor and a second position defining an extension of said bin wall closing off the space between the lower end of said wall and the bin floor when the bin floor is lowered to a position below the level of the unloading conveyor.

11. The apparatus of claim 10, wherein said extension means comprises an elongated member having an upper support surface which when in its said second position is inclined at substantially the same angle from the vertical as said bin wall.

12. The apparatus of claim 8, wherein said means mounting said bin floor comprises operator means operable to lower said bin floor in increments between its raised and lowered positions.

* * * * *